United States Patent [19]
Muto

[11] Patent Number: 5,933,424
[45] Date of Patent: Aug. 3, 1999

[54] TRANSMITTER CAPABLE OF PREVENTING INTERRUPTION ON OCCURRENCE OF A FAULT

[75] Inventor: Hiroyasu Muto, Tokyo, Japan

[73] Assignee: NEC Corporation, Japan

[21] Appl. No.: 08/892,805

[22] Filed: Jul. 15, 1997

[30] Foreign Application Priority Data

Jul. 19, 1996 [JP] Japan ................................. 8-191267

[51] Int. Cl.[6] .................................................. H04B 7/216
[52] U.S. Cl. ......................... 370/342; 370/318; 375/206; 375/208
[58] Field of Search ..................................... 370/320, 335, 370/342, 350, 479, 491, 503; 375/200, 206; 455/68

[56] References Cited

U.S. PATENT DOCUMENTS 5,712,869  1/1998  Lee et al. .............................. 375/206

*Primary Examiner*—Jeffery A. Hofsass
*Assistant Examiner*—Clement Townsend
*Attorney, Agent, or Firm*—Ostrolenk, Faber, Gerb & Soffen, LLP

[57] ABSTRACT

In a transmitter in a CDMA system, a plurality of pilot signals which are identical with each other are sent in a base band region from a plurality of pilot signal generators to be supplied to a plurality of multipliers which are given signal ratios from a monitor/control unit and to be combined together through the multipliers. The signal ratios are varied by the monitor/control unit so that an amplitude of the combined pilot signal is kept constant even when one or more pilot signal generators are faulty.

11 Claims, 4 Drawing Sheets

TRANSMITTER CAPABLE OF PREVENTING INTERRUPTION ON OCCURRENCE OF A FAULT

BACKGROUND OF THE INVENTION

This invention relates to a transmitter for use in a communication system which carries out communication by the use of a pilot signal and, in particular, to a communication apparatus used in a transmitter of a mobile communication system.

In a mobile communication system of a type described, communication is carried out through a forward link or a downward link between a base station and a mobile station or stations located within a service area of the base station. Specifically, the base station transmits data or information signals to the mobile station through the forward link while each mobile station transmits data or information signals to the base station through the backward link. The forward and the backward links may be referred to as down and up links, respectively.

The following description will be mainly directed to the communication which is carried out from the base station to the mobile station through the forward link because the present invention is not directly concerned with communication of the backward link.

Recent interest has been directed to a communication system which uses a code division multiple access (CDMA) technique and which will be called a CDMA system hereinafter. In such a CDMA system, a common frequency is assigned to a plurality of base stations each of which has a peculiar psuedo random number or noise (PN) code. In other words, each base station is specified by a peculiar PN code allocated thereto.

Furthermore, a pilot channel, a sync channel, a paging channel, and a traffic channel are prepared as code channels in the forward link of the CDMA system. In this event, the pilot channel serves to acquire and maintain synchronization in each mobile station and to reproduce a sequence of clocks in each mobile station while the sync channel serves to adjust a PN code between the base and the mobile stations. In addition, the paging channel is used to transmit paging information and hand-off information to each mobile station while the traffic channel is used to transmit a speech signal to each mobile station.

Herein, it is known in the art that the PN code is multiplied by Walsh codes which are different from one another to form spread codes which specify the pilot channel, the sync channel, the paging channel, and the traffic channel. For example, the pilot channel is defined by multiplying the PN code by the Walsh code 0 which is specified by a sequence of zeros. As a result, the PN code itself is transmitted through the pilot channel. In addition, the sync and the paging channels are specified by Walsh codes 32 and 1, respectively, while the traffic channel is specified by Walsh codes n where n is an integer except 0, 1, 2, 3, 4, 5, 6, 7 and 32.

From the above, it appears that a pilot signal arranged in the pilot channel should be correctly reproduced so as to carry out correct coherent detection of any other signals than the pilot signal in each mobile station. Otherwise, the signals arranged in the sync, the paging, and the traffic channels are not accurately reproduced because a phase reference of the coherent detection is not given to the reproduction of the other signals unless the pilot signal is detected.

Under the circumstances, let a pilot signal generator in the base station be faulty for some reason and no pilot signal be received in each mobile station. In this event, the base station itself is put into a halt state and, as a result, a system down takes place in the CDMA system. This is because any phase reference can not be obtained on coherent detection in each mobile station due to no reception of any pilot signal.

Taking the above into consideration, a conventional CDMA system has been proposed which comprises an active unit and a backup unit each of which generates a pilot signal in a manner similar to each other. With this structure, switching is made from the active unit to the backup unit when the former unit becomes faulty and the pilot signal is generated from the backup unit to avoid interruption of the pilot signal.

However, this structure is disadvantageous in that instantaneuos interruption of the pilot signal inevitably takes place in each mobile station while the switching is made from the active unit to the backup unit. Accordingly, any other signals except the pilot signal can be neither received nor detected in each mobile station during the switching period.

SUMMARY OF THE INVENTION

It is an object of this invention to provide a transmitter which is for use in a CDMA system and which is capable of avoiding instantaneous interruption.

It is another object of this invention to provide a transmitter of the type described, which can prevent a system down resulting from interruption of the pilot signal.

It is still another object of this invention to provide a transmitter of the type described, wherein no instantaneous interruption takes place even when a part of the transmitter becomes faulty.

It is yet another object of this invention to provide a communication system which can avoid interruption of a pilot signal even when a part of a transmitter becomes faulty.

A transmitter to which this invention is applicable is for use in a communication system which carries out communication by the use of a transmission pilot signal. According to this invention, the transmitter comprises a plurality of baseband signal producing means for simultaneously producing a plurality of baseband signals each of which includes the same pilot signal, combining means for combining the plurality of the baseband signals into a combined baseband signal which includes a combined pilot signal, and transmitting means for transmitting the combined pilot signal as said transmission pilot signal.

According to another aspect of this invention, the transmitter comprise a plurality of reference signal generating means for simultaneously generating a plurality of reference signals, such as pilot signals, which are identical with each other and which have amplitudes, a plurality of modifying means for individually modifying the amplitudes of the reference signals into modified reference signals having modified amplitudes, respectively, combining means for combining the modified reference signals with each other into a combined reference signal so that a sum of the modified amplitudes is kept substantially constant, and means for transmitting the combined reference signal as said transmission reference signal.

DESCRIPTION OF THE PREFERRED EMBODIMENTS

Figure 1:
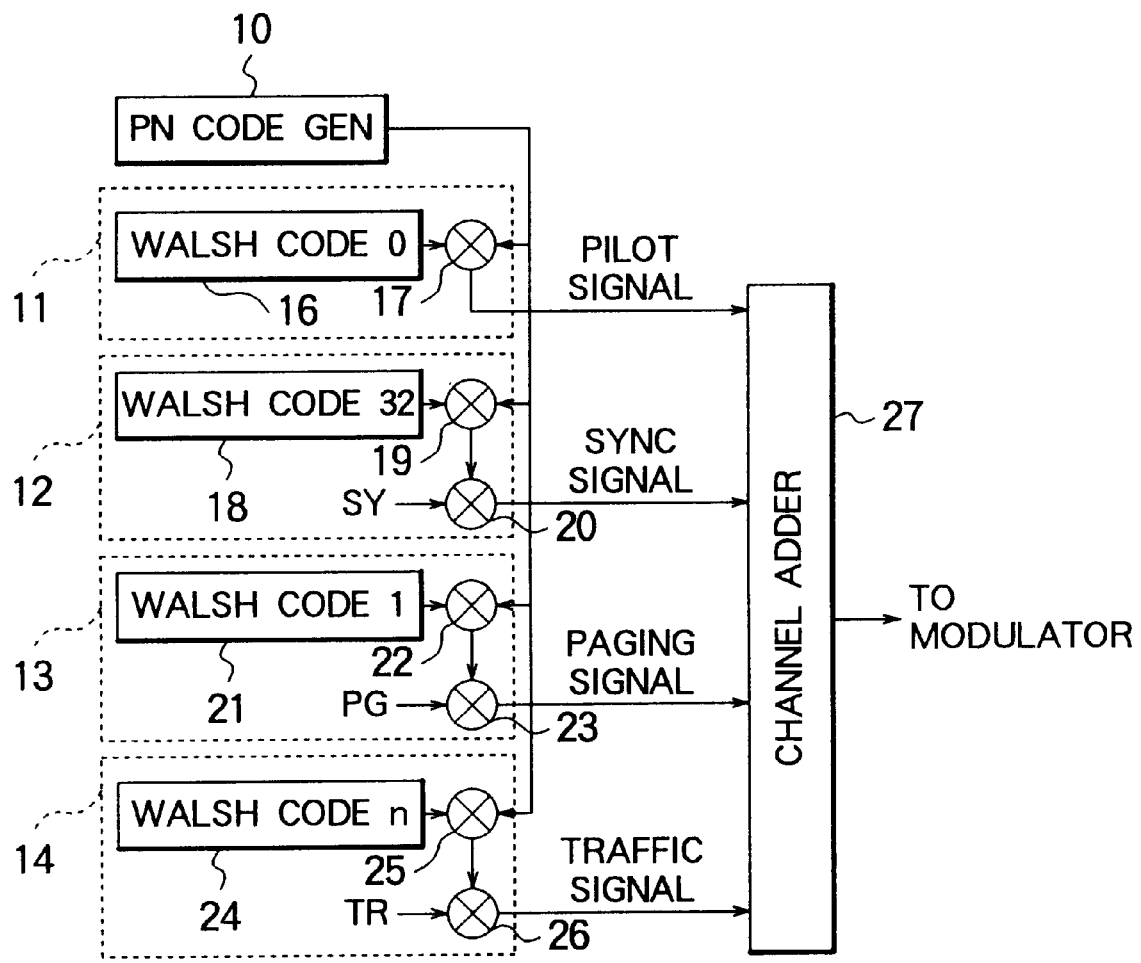
FIG. 1 shows a block diagram for use in describing a part of a transmitter included in a conventional communication system.

Referring to FIG. 1, description will be made about a conventional transmitter used in a base station of a communication system, namely, a CDMA system so as to facilitate understanding of this invention. The illustrated transmitter is specified only by a baseband unit or portion which is connected to a modulator of the base station. The baseband unit is operable to generate a pilot signal, a sync signal, a paging signal, and a traffic signal which are arranged in pilot, sync, paging, and traffic channels, respectively, as mentioned in the preamble of the instant specification.

More specifically, the baseband unit includes a pseudo random number or noise (PN) code generator 10 which generates a PN code predetermined for the base station. In the illustrated example, a pilot signal generator 11 is included together with a sync signal generator 12, a paging signal generator 13 and a traffic signal generator 14. It is assumed that each of the generators 10 to 14 is mounted on a substrate different from one another.

As shown in FIG. 1, the pilot signal generator 11 includes a Walsh code generator 16 which generates a Walsh code 0 specified by a null pattern of all zeros. The Walsh code 0 is given to a multiplier 17 which is supplied with the PN code. As a result, the multiplier 17 mulitplies the PN code by the Walsh code 0 to produce the pilot signal which is identical with the PN code. This shows that the PN code is produced as the pilot signal without any modification and is arranged in the pilot channel.

On the other hand, the sync signal generator 12 is supplied with a sync channel data signal SY from an external circuit (not shown). In addition, the sync signal generator 12 includes a Walsh code generator 18 which generates a predetermined Walsh code 32. The predetermined Walsh code 32 is supplied from the Walsh code generator 18 to a multiplier 19 given the PN code from the PN code generator 10. The PN code is multiplied by the predetermined Walsh code 32 in the multiplier 19 to be sent to a multiplier 20 which is given the sync channel data signal SY. The multiplier 20 multiplies the output signal of the multiplier 19 by the sync channel data signal SY to produce the sync signal.

The paging signal generator 13 is given a paging channel data signal PG from the external circuit and includes a Walsh code generator 21 which generates a predefined Walsh code 1. Like in the sync signal generator 12, the PN code is multiplied by the predefined code 1 in a multiplier 22 and is thereafter sent to a multiplier 23. The multiplier 23 multiplies the output signal of the multiplier 22 by the paging channel data signal PG to produce the paging signal in the paging channel.

Likewise, the traffic signal generator 14 includes a Walsh code generator 24 and multipliers 25 and 26. The Walsh code generator 24 generates a prescribed Walsh code n where n is a natural number except 0, 1, and 32 and supplies the same to the multiplier 25. The multiplier 25 multiplies the PN code by the prescribed Walsh code n to send a result to the multiplier 26. The result of the multiplication is multiplied in the multiplier 26 by a traffic channel data signal TR to be produced as the traffic signal in the traffic channel.

As illustrated in FIG. 1, the pilot, the sync, the paging, and the traffic signals are added to one another by a channel adder 27 to be sent to the modulator as a baseband signal located in the respective channels.

The baseband unit illustrated in FIG. 1 can not cope with interruption of the pilot signal, as mentioned in the preamble of the instant specification.

Figure 2:
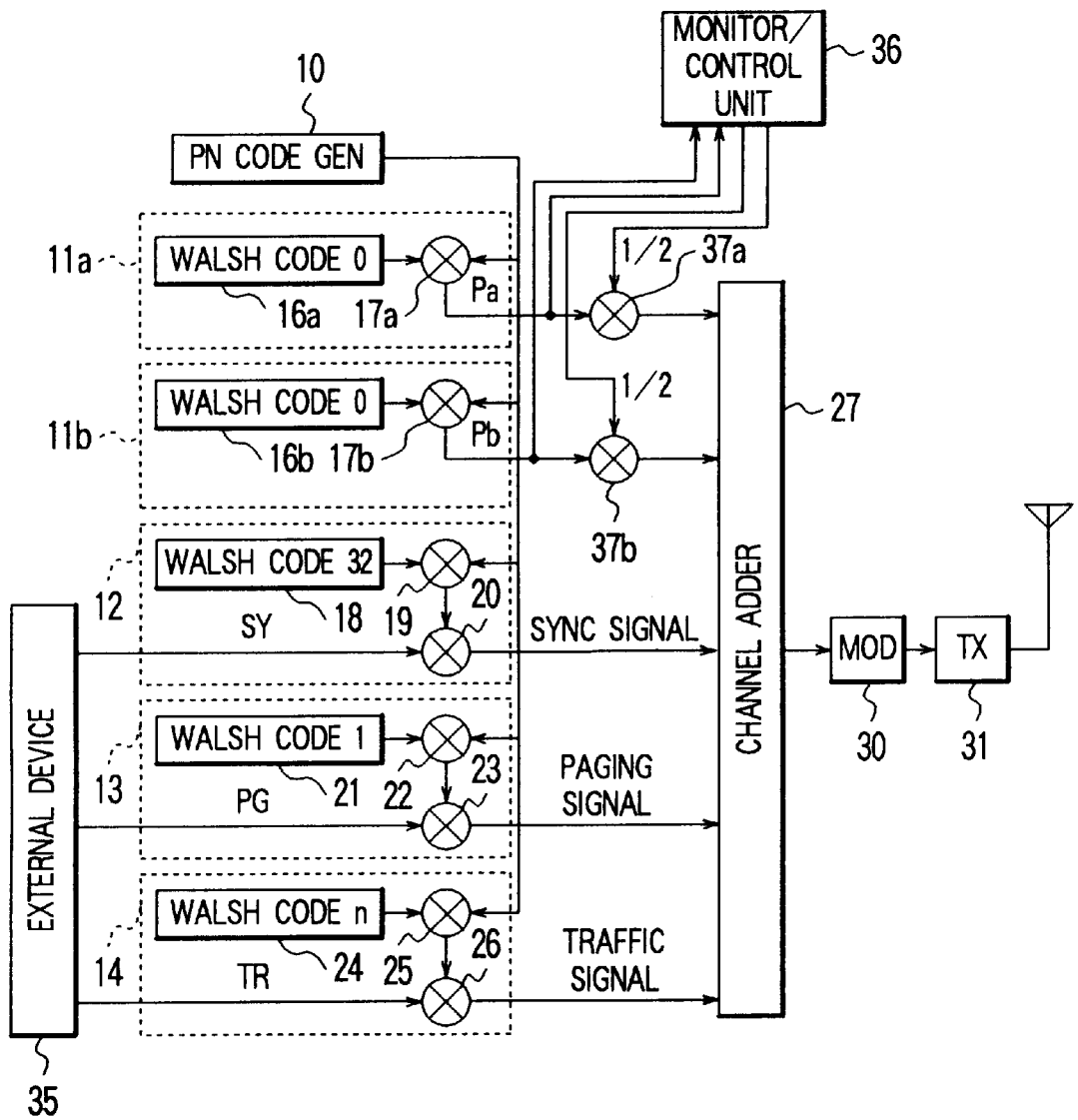
FIG. 2 shows a block diagram for use in describing a transmitter according to a first embodiment of this invention.

Referring to FIG. 2, a transmitter according to a first embodiment of this invention includes a baseband unit together with a modulator (MOD) 30 and a transmitter unit (TX) 31. The illustrated baseband unit comprises similar parts designated by like reference numerals. In this connection, the PN code generator 10, the sync signal generator 12, the paging signal generator 13, and the traffic signal generator 14 are included in the illustrated baseband unit, like in FIG. 1, and may be similar in structure and operation to those shown in FIG. 1. The illustrated sync signal generator 12, the paging signal generator 13, and the traffic signal generator 14 are supplied from an external device 35 with the sync channel data signal SY, the paging channel data signal PG, and the traffic channel data signal TR, respectively. At any rate, the sync signal generator 12, the paging signal generator 13, and the traffic signal generator 14 produce the sync signal, the paging signal, and the traffic signal by the use of the Walsh code 32, the Walsh code 1, and the Walsh code n where n is a natural number except 0, 1, and 32, respectively. The sync, the paging, and the traffic signals are given in the sync, the paging, and the traffic channels, respectively.

Moreover, the baseband unit further includes first and second pilot signal generators 11a and 11b which are identical in structure with each other. Specifically, the first pilot signal generator 11a is formed by a Walsh code generator 16a for generating the Walsh code 0 of all zeros and a a multiplier 17a for multiplying the Walsh code 0 by the PN code supplied from the PN code generator 10 to produce a first pilot signal Pa in the pilot channel. Likewise, the second pilot signal generator 11b is formed by a Walsh code generator 16b for generating the Walsh code 0 and a multiplier 17b for multiplying the Walsh code 0 by the PN code supplied from the PN code generator 10 to produce a second pilot signal Pb in the pilot signal which is the same as the first pilot signal Pa. The first and the second pilot signal generators 11a and 11b are mounted on different substrates from each other.

In the example being illustrated, the first and the second pilot signals Pa and Pb are monitored by a monitor/control unit 36. On the other hand, the monitor/control unit 36 may monitor the first and the second pilot signal generators 11a and 11b in a different manner. For example, a watch dog timer (not shown) included in each of the first and the second pilot signal generators 11a and 11b may be monitored by the monitor/control unit 36. In any event, the monitor/control unit 36 monitors whether or not each of the first and the second pilot signal generators 16a and 16b is faulty.

Although not shown in FIG. 2, the monitor/control unit 36 also practically monitors the sync signal generator 12, the paging signal generator 13, and the traffic signal generator 14, all of which are mounted on substrates different from one another and the first and the second pilot signal generators 11a and 11b.

The first and the second pilot signals Pa and Pb are delivered to first and second multipliers 37a and 37b located between the first and the second pilot signal generators 11a and and 11b and the channel adder 27.

Herein, it is to be noted that the first and the second multipliers 37a and 37b are connected to the monitor/control unit 36, as shown in FIG. 2 to control the first and the second pilot signals Pa and Pb in a manner to be described later in detail. More specifically, as long as both the first and the second pilot signal generators 11a and 11b are normal, the monitor/control unit 36 supplies the first and the second multipliers 37a and 37b with ratio signals representative of 0.5. Therefore, the first and the second pilot signals Pa and Pb are added to each other at an equal rate of 0.5 by the first and the second multipliers 37a and 37b. As a result, a sum signal obtained by adding the first and the second pilot signals Pa and Pb has an amplitude specified by a rate of 1 when no fault takes place in both the first and the second pilot signal generators 11a and 11b. The first and the second pilot signals Pa and Pb are combined with each other to produce a combined pilot signal. Thereafter, the combined pilot signal is added together with the sync signal, the paging signal, and the traffic signal by the channel adder 27 and are thereafter sent as a combined signal to the modulator 30. The combined signal is subjected to modulation, such as PSK or the like by the modulator 30 to be delivered through the transmitter 31 to the mobile station or stations (not shown).

On the other hand, when the monitor/control unit 36 detects that either one of the first and the second pilot signal generators 11a and 11b is faulty or disordered with the remaining pilot signal generator kept in a normal state, the monitor/control unit 36 supplies the normal pilot signal generator with the ratio signal representative of 1 with the faulty pilot signal generator kept in an off-state. Therefore, the pilot signal has the amplitude kept at 1 even when either one of the first and the second pilot signal generators 11a and 11b becomes faulty. This means that the pilot signal is kept invariable even when any fault takes place in either one of the first and the second pilot signal generators 11a and 11b. From this fact, it is readily understood to avoid interruption of the pilot signal even on occurrence of a fault in either one of the first and the second pilot signal generators 11a and 11b and to carry out coherent detection by the use of the pilot signal in each of the mobile stations.

Figure 3:
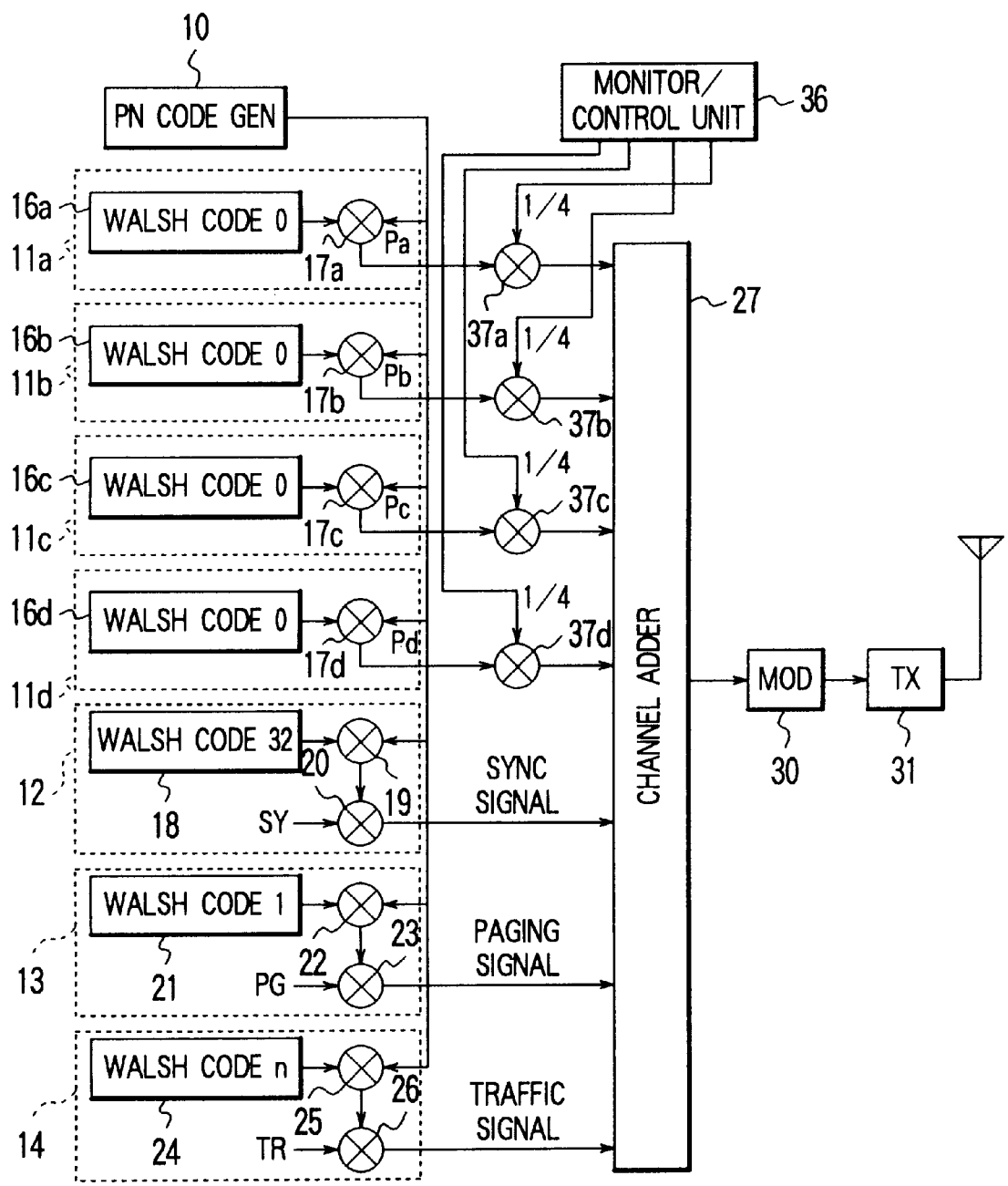
FIG. 3 shows a block diagram of a transmitter according to a second embodiment of this invention.

Referring to FIG. 3, a transmitter according to a second embodiment of this invention is similar in structure except that first through fourth pilot signal generators 11a, 11b, 11c, and 11d are included in the baseband unit and produce the same Walsh codes 0 of null patterns of all zeros. In this connection, first through fourth multipliers 17a to 17d are connected between the first through the fourth pilot signal generators 11a to 11d and the channel adder 27, respectively.

In FIG. 3, each of the first through the fourth pilot signal generators 11a to 11d includes the Walsh code generator 16a to 16d and the multiplier 17a to 17d to produce the Walsh code 0 without any modulation as first through fourth pilot signals Pa to Pd. The first through the fourth pilot signals Pa to Pd or the first through the fourth pilot signal generators 11a to 11d are monitored by the monitor/control unit 36 in the manner mentioned in conjunction with FIG. 2.

With this structure, the monitor/control unit 36 supplies the first through the fourth multipliers 37a to 37d with the first through the fourth rate signals each of which is representative of the signal ratio of ¼ and which is equal in amplitude to one another. The first through the fourth pilot signals Pa to Pd are combined with one another in the channel adder 27 to accomplish the signal ratio of 1 when the first through the fourth pilot signal generators 11a to 11d are normal. Thus, the combined pilot signal has the amplitude specified by the amplitude ratio of 1.

On the other hand, when any fault or disorder occur in one of the first through the fourth pilot signal generators 11a to 11d, the one pilot signal generator is kept in the off-state. On the other hand, the amplitudes of the pilot signals in the remaining three pilot signal generators are controlled by the monitor/control unit 36 so that the sum of the signal ratios in the three pilot signal generators becomes equal to 1. In this case, the monitor/control unit 36 may control the three pilot signal generators so that one of the pilot signal generators has the signal ratio of 0.5 while two pilot signal generators have the signal ratios of 0.25.

With this structure, it is possible to transmit the pilot signal to the mobile stations as long as at least one pilot signal generator is normal. In this case, the monitor/control unit 36 should be able to vary the amplitude signal ratio of each pilot signal from 0.25 to 1.

In FIG. 3, the sync, the paging, and the traffic signal generators 12 to 14 are similar in structure and operation to those illustrated in FIG. 2 and will not be described any longer.

Figure 4:
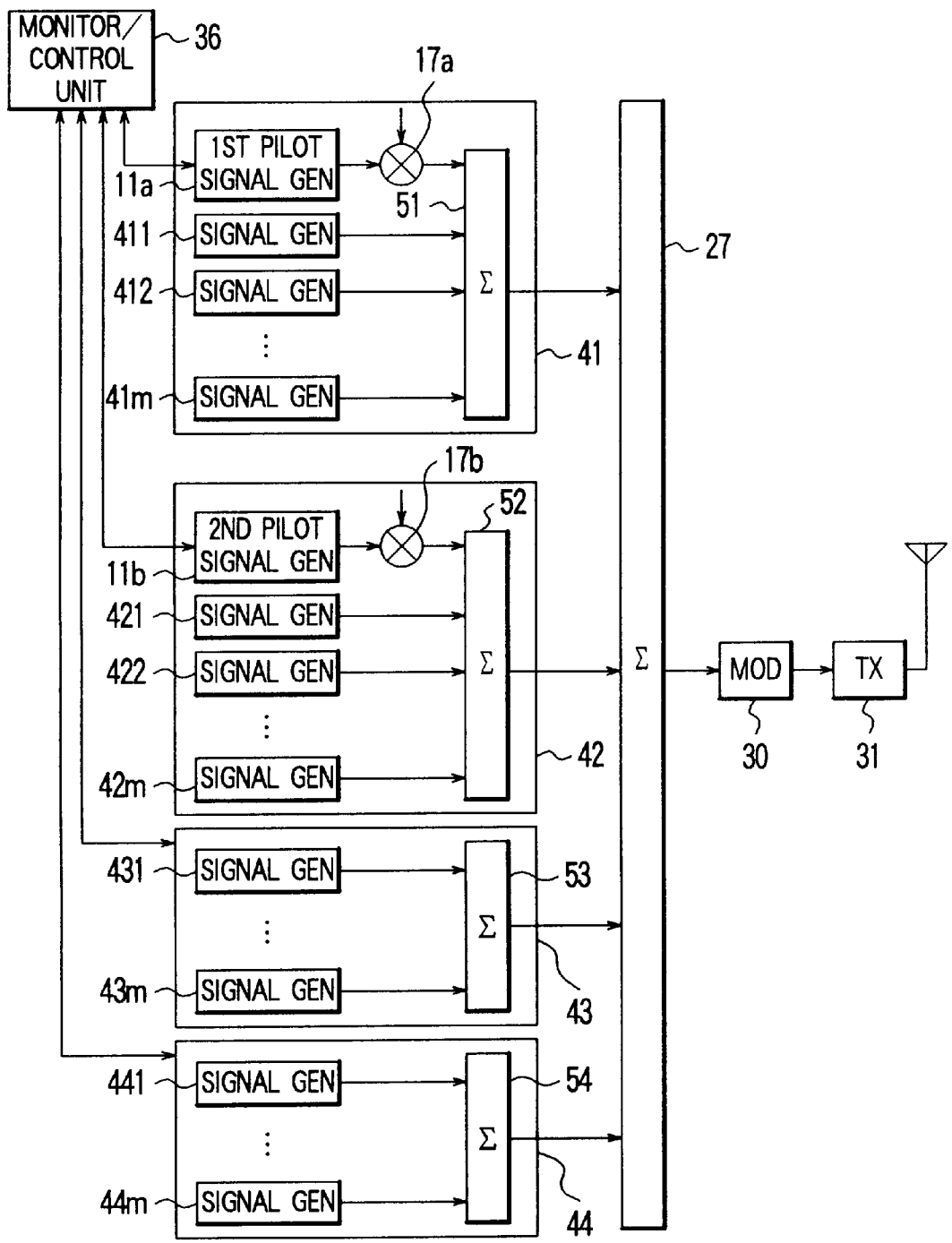
FIG. 4 shows a block diagram of a transmitter according to a third embodiment of this invention.

Referring to FIG. 4, a transmitter according to a third embodiment of this invention has a baseband unit on first through fourth substrates which are equal in number to four in the illustrated example and which are therefore numbered from 41 to 44. The first through the fourth substrates 41 to 44 are monitored and controlled by a monitor/control unit 36. It is assumed in FIG. 4 that an identical PN code is assigned to the first through the fourth substrates 41 to 44.

In the example being illustrated, the first substrate 41 has a first pilot signal generator 11a for generating a first pilot signal Pa. Specifically, the first pilot signal generator 11a modulates the Walsh code 0 by the predetermined PN code orthogonal to the Walsh code 0 to produce the first pilot signal Pa. The first pilot signal Pa is multiplied by the signal ratio sent from the monitor/control unit 36 in the above-mentioned manner. The signal ratio is equal to 0.5 as long as the first substrate 41 is not faulty.

In addition, a plurality of signal generators 411 to 41m are arranged on the first substrate 41 together with the first pilot signal generator 11a and are operable to generate the sync, the paging, the traffic signals based on the Walsh codes different from one another and the Walsh code 0. In this event, a plural sets of the sync, the paging, the traffic signal generators may be arranged on the first substrate 41 as the signal generators 411 to 41m, where m is an integer not smaller than three.

The first pilot signal Pa and the other signals are summed up by a channel adder 51 to produce a combined signal.

On the second substrate 42, a second pilot signal generator 421 is arranged to generate a second pilot signal Pb together with a plurality of signal generators 422 to 42m like the first substrate 41. The second pilot signal is identical with the first pilot signal and is obtained by modulating the Walsh code 0 by the PN code, as mentioned in FIG. 2. The plurality of the signal generators 422 to 42m serve to generate the signals except the second pilot signal Pb by the use of the Walsh codes different from one another and the Walsh code 0.

On each of the third and the fourth substrates 43 and 44, a plurality of signal generators, m in number, namely, 431 to 43m and 441 to 44m, are arranged without the pilot signal generator, such as 11a and 11b. The signal generators 431 to 43m are operated by the use of the Walsh codes different from one another and the Walsh code 0. This applies to the signal generators 441 to 44m. In addition, channel adders 53 and 54 are located on the third and the fourth substrates 43 and 44 to generate combined signals.

The combined signals which are sent from the first through the fourth substrates 41 to 44 are delivered to a channel adder 27 to be multiplexed together and to be produced as a transmission signal. As a result, a multiplexed signal is produced by the channel adder 27 and subjected to quadrature modulation in the modulator (MOD) 30. A modulated signal is sent from the transmitter (TX) 31 to be sent to the mobile stations as a radio signal. Thus, the signal of each channel is multiplexed and carried by a single frequency in the CDMA system.

In FIG. 4, the first and the second pilot signal generators 11a and 11b generate the pilot signals which are identical with each other. Each of the pilot signal is generated by modulating the Walsh code 0 by the PN code orthogonal to the Walsh code 0 and is specified by a composite signal which is composed of an in-phase component and a quadrature component in a base band region.

When the first and the second pilot signal generators 11a and 11b are operated in a normal state, the first and the second multipliers 17a and 17b are given the signal ratios of 0.5, respectively.

On the other hand, when the monitor/control unit 36 detects that either one of the first and the second pilot signal generators 11a and 11b is faulty, a faulty one of the substrates is interrupted under control of the monitor/control unit 36. When the interruption is carried out, the faulty substrate can not transmit the pilot signal and the other signals. However, inasmuch the pilot signal is generated by another pilot signal generator and is sent to the mobile stations. Under the circumstances, the coherent detection can be done in each mobile station in response to the pilot signal. In this case, the signal rate in the normal pilot signal generator is changed from 0.5 to 1 under control of the monitor/control unit 36 and is given to the multiplier of the normal pilot signal generator.

As mentioned above, this invention can prevent instantaneous interruption of the pilot signal even when a fault takes place in a part of hardware used in the transmitter of the base station. Moreover, it is possible to keep the amplitude of a transmission pilot signal substantially constant before and after occurrence of the fault.

While this invention has thus far been described in conjunction with a few embodiments thereof, it will be readily possible for those skilled in the art to put this invention into various other manners. For example, the number of the pilot signal generators may not be restricted to even number but odd number. Moreover, although description has been restricted to the pilot signals, a plurality of the sync signals or the paging signals may be used to monitor a fault as reference signals instead or in addition to the pilot signals.

What is claimed is:

1. A transmitter for use in a communication system which carries out communication by the use of a transmission pilot signal, the transmitter comprising:

a plurality of pilot signal generating means for simultaneously generating a plurality of pilot signals which are identical with each other;

combining means for combining the plurality of the pilot signals into a combined pilot signal; and transmitting means for transmitting the combined pilot signal as said transmission pilot signal.

2. A transmitter as claimed in claim 1, further comprising:

monitoring means for monitoring the plurality of the pilot signal generating means to detect whether or not each of the pilot signal generating means is faulty and to put a faulty one of the pilot signal generating into an inactive state on detection of the faulty one of the pilot signal generating means.

3. A transmitter for use in a communication system by the use of a transmission reference signal, the transmitter comprising:

a plurality of reference signal generating means for simultaneously generating a plurality of reference signals which are identical with each other and which have amplitudes;

a plurality of modifying means for individually modifying the amplitudes of the reference signals into modified reference signals having modified amplitudes, respectively;

combining means for combining the modified reference signals with each other into a combined reference signal so that a sum of the modified amplitudes is kept substantially constant; and means for transmitting the combined reference signal as said transmission reference signal.

4. A transmitter as claimed in claim 3, further comprising:

monitoring means for monitoring whether or not each of the plurality of the reference signal generating means is put into an faulty state to supply a ratio signal representative of a ratio of the amplitudes of the reference signals;

said plurality of the reference signal generating means being controlled so as to produce the reference signals which have the amplitudes specified by the ratio signal.

5. A transmitter as claimed in claim 4, wherein the monitoring means controls the plurality of the reference signal generating means by the ratio signal so that a faulty one of the reference signal generating means is put into an inactive state while the remaining reference signal generating means are put into active states to keep the amplitudes of the reference signals substantially constant.

6. A transmitter as claimed in claim 5, wherein the reference signals are pilot signals used in a CDMA communication system.

7. A transmitter as claimed in claim 6, wherein the pilot signals are generated by the use of a predetermined psuedo random number (PN) code and the predetermined Walsh code.

8. A transmitter as claimed in claim 7, wherein the predetermined Walsh code is the Walsh code 0.

9. A transmitter as claimed in claim 8, wherein the plurality of the reference signal generating means are mounted on substrates different from each other.

10. A transmitter as claimed in claim 9, further comprising:

sync signal generating means for generating a sync signal used in the CDMA communication system;

paging signal generating means for generating a paging signal used in the CDMA communication system; and traffic signal generating means for generating a traffic signal used in the CDMA communication system.

11. A transmitter as claimed in claim 10, wherein the sync, the paging, and the traffic signals are generated by the use of a PN code identical with said predetermined PN code and Walsh codes which are different from one another and the Walsh code 0.

* * * * *